United States Patent
Gadepalli et al.

(10) Patent No.: US 12,001,836 B2
(45) Date of Patent: Jun. 4, 2024

(54) METHOD AND SYSTEM FOR PERFORMING DYNAMIC PATCH MANAGEMENT IN A VIRTUAL DESKTOP INFRASTRUCTURE (VDI) PLATFORM

(71) Applicant: Wipro Limited, Bangalore (IN)

(72) Inventors: Satya Sairam Gadepalli, Hyderabad (IN); Seshu Venkata, Hyderabad (IN)

(73) Assignee: Wipro Limited, Bangalore (IN)

( * ) Notice: Subject to any disclaimer, the term of this patent is extended or adjusted under 35 U.S.C. 154(b) by 288 days.

(21) Appl. No.: 17/450,850

(22) Filed: Oct. 14, 2021

(65) Prior Publication Data
US 2023/0040047 A1     Feb. 9, 2023

(30) Foreign Application Priority Data
Aug. 2, 2021   (IN) .............. 202141034801

(51) Int. Cl.
| | |
|---|---|
| *G06F 8/658* | (2018.01) |
| *G06F 8/71* | (2018.01) |
| *G06F 9/455* | (2018.01) |
| *G06F 11/14* | (2006.01) |
| *G06F 11/30* | (2006.01) |

(Continued)

(52) U.S. Cl.
CPC ............... *G06F 8/658* (2018.02); *G06F 8/71* (2013.01); *G06F 9/45558* (2013.01); *G06F 11/142* (2013.01); *G06F 11/301* (2013.01); *G06F 16/951* (2019.01); *G06F 21/577* (2013.01); *G06F 2009/45587* (2013.01); *G06F 2009/45591* (2013.01); *G06F 2009/45595* (2013.01)

(58) Field of Classification Search
CPC ........ G06F 8/658; G06F 8/71; G06F 9/45558; G06F 11/142; G06F 11/301; G06F 16/951; G06F 21/577; G06F 2009/45587; G06F 2009/45591; G06F 2009/45595; G06F 8/65; G06F 9/452
See application file for complete search history.

(56) References Cited

U.S. PATENT DOCUMENTS

| | | | |
|---|---|---|---|
| 8,151,258 B2 | 4/2012 | Russell et al. | |
| 8,549,272 B2 * | 10/2013 | Mullin | ................ G06F 9/45533 718/1 |

(Continued)

*Primary Examiner* — Matthew J Brophy
(74) *Attorney, Agent, or Firm* — Finnegan, Henderson, Farabow, Garrett & Dunner, LLP

(57) ABSTRACT

The present disclosure is related to Virtual Desktop Infrastructure (VDI) that discloses a method and system for performing dynamic patch management in VDI platform. A patch managing system retrieves operational data and vulnerability remediation data related to IT services and infrastructures of the VDI platform from first and second data sources. Thereafter, the patch managing system detects gap in patching level based on operational data, vulnerability remediation data and corresponding industrial standard, and rolls out patches based on detected gap in patching level. Further, a patch prediction score that facilitates in identifying a probability of rolling back the patches rolled out for patching IT services and infrastructures of VDI platform is determined based on prediction parameters. A plan is generated based on the patch prediction score and executed to optimally patch the patches to IT services and infrastructures of the VDI platform, based on patching rules.

18 Claims, 13 Drawing Sheets

(51) Int. Cl.
*G06F 16/951* (2019.01)
*G06F 21/57* (2013.01)

(56) References Cited

U.S. PATENT DOCUMENTS

| | | | |
|---|---|---|---|
| 8,959,322 B2* | 2/2015 | Mullin | G06F 9/452 |
| | | | 718/1 |
| 9,477,462 B2 | 10/2016 | Felts | |
| 10,609,079 B2* | 3/2020 | Crabtree | G06N 20/00 |
| 11,474,839 B2* | 10/2022 | Kelly | G06F 9/5077 |
| 11,520,609 B2* | 12/2022 | Babol | G06F 9/452 |
| 11,562,077 B2* | 1/2023 | Markandaya Lakshminarasimha | G06F 21/577 |
| 2006/0080656 A1* | 4/2006 | Cain | G06F 8/65 |
| | | | 434/118 |
| 2011/0197051 A1* | 8/2011 | Mullin | G06F 8/65 |
| | | | 718/1 |
| 2014/0026135 A1* | 1/2014 | Mullin | G06F 9/45533 |
| | | | 718/1 |
| 2014/0137118 A1 | 5/2014 | Mcneill | |
| 2016/0103673 A1* | 4/2016 | Curran | G06F 8/658 |
| | | | 717/168 |
| 2018/0295154 A1* | 10/2018 | Crabtree | H04L 63/1433 |
| 2019/0087204 A1* | 3/2019 | Babol | G06F 21/105 |
| 2019/0258497 A1* | 8/2019 | Babol | G06F 9/45533 |
| 2021/0273968 A1* | 9/2021 | Shaieb | H04L 63/1433 |
| 2021/0319111 A1* | 10/2021 | Markandaya Lakshminarasimha | G06F 9/505 |
| 2022/0083355 A1* | 3/2022 | Kelly | G06F 9/5061 |
| 2022/0342659 A1* | 10/2022 | Parthasarathy | G06F 11/3409 |
| 2022/0365859 A1* | 11/2022 | Borkar | G06F 11/3438 |
| 2022/0385699 A1* | 12/2022 | Gupta | H04L 67/08 |
| 2023/0040047 A1* | 2/2023 | Gadepalli | G06F 21/577 |

* cited by examiner

| Model | File Name | Patch Type | Patch Version | Patch release date | Upgrade Requirement | OS | Install Instructions | Previously installed patch version | Previously installed date | Known issues with latest patch/previous patch | Dependent Applications |
|---|---|---|---|---|---|---|---|---|---|---|---|
| HP DL 380 Gen 10 | U30_1.42_06_20_2018.fwpkg | System ROM | 2.42 | 2 Feb 2021 | Critical | NA | Reboot: 1 | 1.42 | 20 June 2020 | ABC, PQR, MNO | { DEF V 1.0, XYZ , , , , } |
| HP DL 380 Gen 10 | U30_1.42_06_20_2018.fwpkg | BIOS - System ROM | 1.42_0 6-20-2018 | 27 Sep 2018 | Non-Critical | VMware ESXi 6.7 | Reboot: 1 | 1.40 | 01 January 2020 | ABGHE | None |

FIG.2B

| Condition | Condition | Condition | Condition | Condition | Conclusion | Conclusion | Conclusion |
|---|---|---|---|---|---|---|---|
| ServiceId | FrameType | firmwareName | patchDate | Threshold | MissingField | ThemeContext | QuestionContext |
| Is Empty FALSE | Is firmware | Is Empty TRUE | | Is 1 | Is firmware_Q1 | Is 101 | Is A11 |
| Is Empty FALSE | Is firmware | Is Empty TRUE | | Is 2 | Is firmware_Q2 | Is 101 | Is A11 |
| Is Empty FALSE | Is firmware | Is Empty FALSE | Is Empty TRUE | Is 1 | Is patchDate_Q1 | Is 101 | Is A12 |
| Is Empty FALSE | Is firmware | Is Empty FALSE | Is Empty TRUE | Is 2 | Is pachDate_Q2 | Is 101 | Is A12 |
| Is Empty FALSE | Is firmware | Is Empty FALSE | Is Empty FALSE | Is 1 | Is OS_Name_Q1 | Is 201 | Is B11 |

| Condition | Condition | Condition | Condition | Condition | Condition | Condition | Condition | Condition | Condition | Conclusion | Conclusion | Conclusion |
|---|---|---|---|---|---|---|---|---|---|---|---|---|
| ServiceId | FrameType | PrevQuestion | Affirmative | PositiveFeature | Negation | HypervisorPatchName | Hypervisor Patch Name | PatchDate | Threshold | MissingField | ThemeContext | QuestionContext |
| IsEmpty FALSE | Is hypervisor | | | | | IsEmpty | TRUE | | Is 1 | Is PatchCategory_Q1 | Is 201 | Is B11 |
| IsEmpty FALSE | Is hypervisor | | | | | IsEmpty | TRUE | | Is 2 | Is PatchCategory_Q2 | Is 201 | Is B11 |
| IsEmpty FALSE | Is hypervisor | | | | | IsEmpty | IsEmpty | | Is 1 | Is PatchCategory_Q1 | Is 201 | Is B12 |
| IsEmpty FALSE | Is hypervisor | | | | | IsEmpty | IsEmpty | | Is 2 | Is PatchCategory_Q2 | Is 201 | Is B12 |
| IsEmpty FALSE | Is hypervisor | | | | | FALSE | IsEmpty | TRUE | Is 1 | Is Patch_Year_Q1 | Is 201 | Is B13 |
| IsEmpty FALSE | Is hypervisor | | | | | FALSE | IsEmpty | TRUE | Is 2 | Is Patch_Year_Q2 | Is 201 | Is B13 |
| IsEmpty FALSE | Is hypervisor | | | | | FALSE | IsEmpty | FALSE | Is 1 | Is Application_Patch_Q1 | Is 301 | Is C11 |

| Condition ServiceId | Condition FrameType | Condition PrevQuestion | Condition Affirmative | Condition PositiveFeature | Condition Negation | Condition Hypervisor PatchName | Condition Hypervisor Patch Name | Condition Patch Date | Condition Threshold | Conclusion MissingField | Conclusion ThemeContext | Conclusion QuestionContext |
|---|---|---|---|---|---|---|---|---|---|---|---|---|
| Is Empty FALSE | Is hypervisor | Is the firmware updated? | Is yes | | | | | | | | | |
| Is Empty FALSE | Is hypervisor | Is the firmware updated? | | | Is Empty FALSE | | | | Is | FirmwareValidationEdit | Is 201 | Is C14 |
| Is Empty FALSE | Is hypervisor | Is the firmware updated? | | Is Empty FALSE | Is Empty FALSE | | | | Is | FirmwareValidationEdit | Is 201 | Is C14 |
| Is Empty FALSE | Is hypervisor | Is the firmware updated? | | Is Empty FALSE | | | | | Is | HypervisorPatchName_Q1 | Is 401 | Is D11 |
| Is Empty FALSE | Is hypervisor | | | | Is Empty FALSE | | | | Is | FirmwareValidationEdit | Is 201 | Is C14 |
| Is Empty FALSE | Is hypervisor | | Is yes | | | | | | Is | HypervisorPatchName_Q1 | Is 401 | Is D11 |
| Is Empty FALSE | Is hypervisor | | | | Is Empty FALSE | | | | Is | HypervisorPatchName_Q1 | Is 201 | Is C14 |

FIG.2D (Continued)

| Condition | Condition | Condition | Condition | Condition | Condition | Condition | Condition | Condition | Condition | Conclusion | Conclusion | Conclusion |
|---|---|---|---|---|---|---|---|---|---|---|---|---|
| ServiceId | FrameType | PrevQuestion | Affirmative | PositiveFeature | Negation | ServiceName | ApplicationPatchName | ApplicationPatchReleaseDate | Threshold | MissingField | ThemeContext | QuestionContext |
| Is Empty FALSE | Is application | | | | | Is Empty TRUE | | | | Is OSPatchName_Q1 | Is 301 | Is C11 |
| Is Empty FALSE | Is application | | | | | Is Empty TRUE | | | | Is OSPatchName_Q2 | Is 301 | Is C11 |
| Is Empty FALSE | Is application | | | | | Is Empty FALSE | Is Empty TRUE | | Is 1 | Is OSPatchName_Q1 | Is 301 | Is C12 |
| Is Empty FALSE | Is application | | | | | Is Empty FALSE | Is Empty TRUE | | Is 2 | Is OSPatchName_Q2 | Is 301 | Is C12 |
| Is Empty FALSE | Is application | | | | | Is Empty FALSE | Is Empty FALSE | Is Empty TRUE | Is 1 | Is ApplicationPatch_Year_Q1 | Is 301 | Is C13 |
| Is Empty FALSE | Is application | | | | | Is Empty FALSE | Is Empty FALSE | Is Empty TRUE | Is 2 | Is ApplicationPatch_Q2 | Is 301 | Is C13 |
| Is Empty FALSE | Is application | | | | | Is Empty FALSE | Is Empty FALSE | Is Empty FALSE | | Is HypervisorValidationEdit | Is 301 | Is C14 |

FIG.2E

| Condition | Condition | Condition | Condition | Condition | Condition | Condition | Condition | Condition | Condition | Condition | Conclusion | Conclusion | Conclusion |
|---|---|---|---|---|---|---|---|---|---|---|---|---|---|
| ServiceId | Frame Type | PrevQuestion | Affirmative | PositiveFeature | Negation | ServiceName | ApplicationPatchName | ApplicationPatchReleaseDate | Threshold | MissingField | Theme Context | Question Context |
| Is Empty FALSE | application | Is the Hypervisor updated? Is | Is yes | | Is Empty FALSE | | | | | HypervisorValidationEdit Is | Is 301 | Is C14 |
| Is Empty FALSE | application | Is the Hypervisor updated? Is | | Is Empty FALSE | Is Empty FALSE | | | | | HypervisorValidationEdit Is | Is 301 | Is C14 |
| Is Empty FALSE | application | Is the Hypervisor updated? Is | | Is Empty FALSE | | | | | | OSPatch_Q1 Is | Is 401 | Is D11 |
| Is Empty FALSE | application | Is the Hypervisor updated? Is | | | Is Empty FALSE | | | | | HypervisorValidationEdit Is | Is 301 | Is C14 |
| Is Empty FALSE | application | | Is yes | | | | | | | OSPatch_Q1 Is | Is 401 | Is D11 |
| Is Empty FALSE | application | | | | Is Empty FALSE | | | | | HypervisorValidationEdit Is | Is 301 | Is C14 |

FIG.2E (continued)

| Prediction Parameters: (Score) | Layer: Firmware Weightage: 10% | Layer: Hypervisor Weightage: 40% | Layer: VM OS Weightage: 30% | Layer: Application Weightage: 20% |
|---|---|---|---|---|
| Age of Patch release<br>- < 1 Months (100)<br>- > 1 && < 3 Months (50)<br>- >3 && < 6 Months (30)<br>- >6 Months (10) | 50 | 50 | 100 | 30 |
| Severity level of Patch<br>- High (100)<br>- Medium (50)<br>- Low (20) | 100 | 100 | 50 | 20 |
| Impact of the Patch<br>- Maintenance (50)<br>- Reboot (30) | 30 | 50 | 50 | 30 |
| Gap to be updated<br>- <= 1 (100)<br>- <= 2 (50)<br>- >2 && << 5 (20) | 100 | 100 | 20 | 50 |
| .... | .. | .. | .. | .. |
| ..... | .. | .. | .. | .. |

FIG.2F

| Prediction Parameters: (Score) | Layer: Firmware Weightage: 10% | Layer: Hypervisor Weightage: 40% | Layer: VM OS Weightage: 30% | Layer: Application Weightage: 20% |
|---|---|---|---|---|
| Reboot Score<br>- No Reboot ( 100 )<br>- Single Reboot ( 50 )<br>- Multiple Reboot (20) | 50 | 100 | 20 | 50 |
| Uninstalling Requirement of Old Software<br>- None ( 100 )<br>- Single Package (50)<br>- Multiple Packages (20) | 100 | 100 | 50 | 50 |
| Dependent Patch Package Length<br>- Zero ( 100 )<br>- <5 Packages ( 50 )<br>- >5 <15 (20 )<br>- >20 ( 10 ) | 50 | 100 | 20 | 50 |
| Type of Patch<br>- Stand alone (100)<br>- Rollup( 50)<br>- Cumulative( 20) | 100 | 20 | 50 | 100 |

FIG.2F (continued)

| Layer | Uninstall (U) (−) | Install (I) (+) | Reboot (R) | Test Cases (T) | Rollback Steps (RB) | Severity Level of patch | Action to fill the gaps in the patching level |
|---|---|---|---|---|---|---|---|
| Firmware | - | I1<br>I2<br>I3 | R1 | T1<br>T2 | RB1 | High | 1. I1<br>2. I2<br>3. I3 |
| VM OS | U1,<br>U2,<br>U3 | I1<br>I2<br>I3 | R1<br>R2<br>R3<br>R4 | T1<br>T2 | RB1<br>RB 2<br>RB 3 | Medium | 4. U1->I1,<br>5. U2->I2->R1->R2<br>6. U3->I3->R4/T1,T2 |

FIG.2G

METHOD AND SYSTEM FOR PERFORMING DYNAMIC PATCH MANAGEMENT IN A VIRTUAL DESKTOP INFRASTRUCTURE (VDI) PLATFORM

TECHNICAL FIELD

The present subject matter is related in general to Virtual Desktop Infrastructure (VDI), and more particularly, but not exclusively to a method and system for performing dynamic patch management in a Virtual Desktop Infrastructure (VDI) platform.

BACKGROUND

Generally, VDI (Virtual Desktop Infrastructure) is a technology used to create a virtualized desktop environment on a remote server setup. The VDI segments one or more servers into various virtual desktops, which a user may access remotely through their computing devices. Such virtual desktops may be hosted on Virtual Machines (VMs), which are controlled through management software. The VDI provides freedom to the user for accessing a user's desktop from anywhere at any time through a VDI client software. For a smooth running and maintaining of the VDI platform, Information Technology (IT) services or infrastructure of the VDI platform should undergo an evergreening process. Evergreening of IT services and infrastructure of the VDI platform refers to running services comprising one or more components that are always up to date. The evergreening of the IT services and the infrastructure of the VDI platform not only encompasses the services at user level but even at underlying infrastructure level. Generally, evergreening process is performed by installation of one or more patch management systems that are applicable for handling both physical software applications as well as virtual software applications of the VDI platform. The one or more patch management systems process acquisition, testing and installation of multiple software patches on the existing virtual software applications, thereby enabling the virtual software applications to stay updated regarding available software patches and to determine the software patches that are appropriate for the existing virtual software applications. The IT services and infrastructure of the VDI platform that are used without performing the evergreening process i.e. without updating latest software patches would be vulnerable to cyberattacks and may affect the security policies of an enterprise using the VDI platform.

Conventionally, evergreening of the IT services or infrastructure of the VDI platform includes managing the patching activity by shutting down one or more virtual machines and restarting the machines upon completion of the patching activity. Also, such evergreening mechanisms involve manual intervention to estimate suitable time for performing patching activity. Therefore, the conventional evergreening mechanisms lead to wastage of manpower, wastage of time and also affect the business performance largely if the infrastructure and the IT services are not updated when there is a requirement. In addition, such conventional approaches may perform the patching activity of the infrastructure and the IT services during business hours of the enterprise that causes halting of the work, slowing down of the work or work interruption for the enterprise, which may lead to loss of time, resources, productivity and money for the enterprise. Furthermore, such conventional approaches are unable to identify one or more virtual machines of the VDI platform which are complaint for patching or virtual machines which are not updated recently and require patching immediately, thereby resulting in late patching i.e. not being able to patch the IT services and the virtual machines in-time when there is a requirement. This may further make the IT services and the virtual machines vulnerable to cyber attacks. Moreover, the conventional approaches do not maintain continuous integration in evergreening of the software applications in the virtual environment, which results in one or more business risks and affects business performance by creating losses.

One of the existing techniques leverages drone virtual machines to support asynchronous patch management by initiating a drone virtual machine in a maintenance environment to perform a patch management update, to save the updated virtual machine and then to initiate the updated virtual machine in an operational environment. This existing technique manages the virtual machines of the VDI platform by detecting requests for initiation of the virtual machines to an operational environment, in response to which the drone of the virtual machines are initiated in a maintenance environment to detect a patch compliance state. Such existing technique for applying software patching is time-consuming, dependent upon detection of the virtual machine and creates a problem in matching the software patches with latest releases of the application. Also, this existing technique may be risky in case of mismatch between an updated version of the software patch and a new version of the application.

Yet another existing technique discloses receiving a first set of software patches over a network connection, determining a second set of software patches based on a group of software patches installed on a computing device and the received first set of software patches, and installing the determined second set of software patches on the computing device. However, this existing technique is applicable only in a non-virtual environment based on a group of software patches installed on a computing device and a group of available software patches, which is non-challenging and involves fewer risks as compared to the virtual environment.

Thus, there is a need for an improved mechanism for dynamically performing patch management for IT services and infrastructure of the VDI platform.

The information disclosed in this background of the disclosure section is only for enhancement of understanding of the general background of the disclosure and should not be taken as an acknowledgement or any form of suggestion that this information forms prior art already known to a person skilled in the art.

SUMMARY

Disclosed herein is a method of performing dynamic patch management in a Virtual Desktop Infrastructure (VDI) platform. The method includes retrieving, by a patch managing system, operational data from one or more first data sources and vulnerability remediation data from one or more second data sources. The operational data and the vulnerability remediation data are related to at least one of, one or more Information Technology (IT) services and one or more infrastructures of a VDI platform. Thereafter, the method includes detecting a gap in patching level based on the operational data, the vulnerability remediation data and a corresponding industrial standard. The one or more patches are rolled out for patching at least one of, the one or more IT services and the one or more infrastructures of the VDI platform based on the detected gap in the patching level. Upon detecting the gap in the patching level, the method includes determining a patch prediction score based on one or more prediction parameters. The patch prediction score facilitates in identifying a probability of rolling back the one or more patches rolled out for patching at least one of, the one or more IT services and the one or more infrastructures of the VDI platform. Finally, the method includes executing a plan to optimally patch the one or more patches to at least one of, the one or more IT services and the one or more infrastructures of the VDI platform, based on one or more patching rules. The plan is generated based on the patch prediction score.

Further, the present disclosure includes a patch management system for performing dynamic patch management in a Virtual Desktop Infrastructure (VDI) platform. The patch management system includes a processor and a memory communicatively coupled to the processor. The memory stores the processor-executable instructions, which, on execution, causes the processor to retrieve operational data from one or more first data sources and vulnerability remediation data from one or more second data sources. The operational data and the vulnerability remediation data are related to at least one of, one or more Information Technology (IT) services and one or more infrastructures of a VDI platform. Thereafter, the processor detects a gap in patching level based on the operational data, the vulnerability remediation data and a corresponding industrial standard. The one or more patches are rolled out for patching at least one of, the one or more IT services and the one or more infrastructures of the VDI platform based on the detected gap in the patching level. Upon detecting the gap in the patching level, the processor determines a patch prediction score based on one or more prediction parameters. The patch prediction score facilitates in identifying a probability of rolling back the one or more patches rolled out for patching at least one of, the one or more IT services and the one or more infrastructures of the VDI platform. Finally, the processor executes a plan to optimally patch the one or more patches to at least one of, the one or more IT services and the one or more infrastructures of the VDI platform, based on one or more patching rules. The plan is generated based on the patch prediction score.

Furthermore, the present disclosure comprises a non-transitory computer readable medium including instructions stored thereon that when processed by at least one processor causes the patch managing system to perform operations comprising retrieving operational data from one or more first data sources and vulnerability remediation data from one or more second data sources. The operational data and the vulnerability remediation data are related to at least one of, one or more Information Technology (IT) services and one or more infrastructures of a VDI platform. Further, the instructions cause the processor to detect a gap in patching level based on the operational data, the vulnerability remediation data and a corresponding industrial standard. One or more patches are rolled out for patching at least one of, the one or more IT services and the one or more infrastructures of the VDI platform based on the detected gap in the patching level. Furthermore, the instructions cause the processor to determine a patch prediction score based on one or more prediction parameters. The patch prediction score facilitates in identifying a probability of rolling back the one or more patches rolled out for patching at least one of, the one or more IT services and the one or more infrastructures of the VDI platform. Finally, the instructions cause the processor to execute a plan to optimally patch the one or more patches to at least one of, the one or more IT services and the one or more infrastructures of the VDI platform, based on one or more patching rules. The plan is generated based on the patch prediction score.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 2B shows a table indicating exemplary patch data in accordance with some embodiments of the present disclosure;

FIG. 2C indicates exemplary patching rules for upgrading firmware, used for generating and executing plan for patching the one or more patches, in accordance with some embodiments of the present disclosure;

FIG. 2D indicates exemplary patching rules for upgrading Hypervisor, used for generating and executing plan for patching the one or more patches, in accordance with some embodiments of the present disclosure;

FIG. 2E indicates exemplary patching rules for upgrading an application, used for generating and executing plan for patching the one or more patches, in accordance with some embodiments of the present disclosure;

FIG. 2F shows a table indicating exemplary scores and weightages assigned to different prediction parameters and different layers respectively, in accordance with some embodiments of the present disclosure;

FIG. 2G shows a table with exemplary values that indicate need for performing one or more actions at different layers for patch management, in accordance with some embodiments of the present disclosure;

Figure 1:
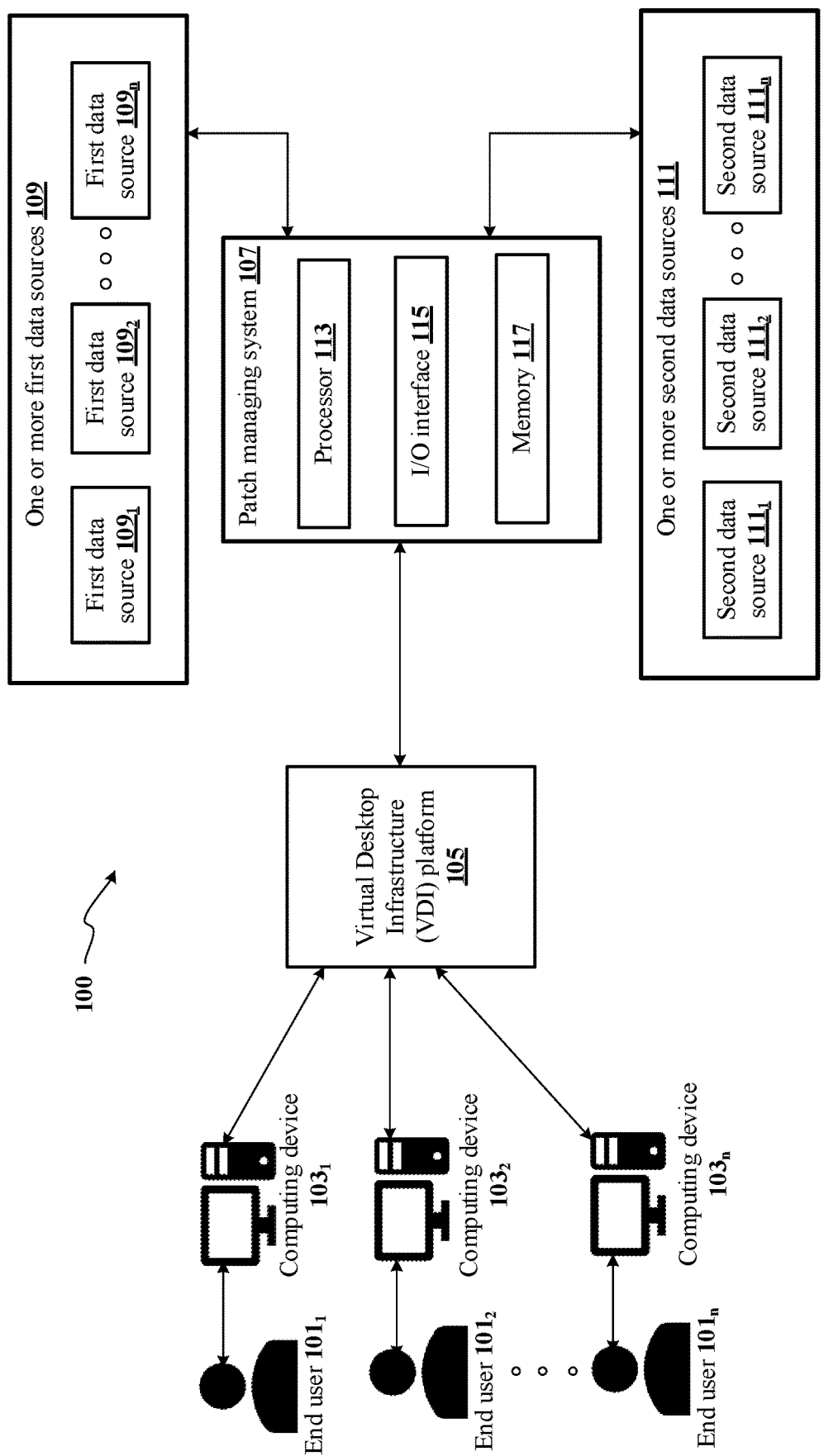
FIG. 1 shows an exemplary architecture for performing dynamic patch management in a Virtual Desktop Infrastructure (VDI) platform in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure provides a method and a system for performing dynamic patch management in a Virtual Desktop Infrastructure (VDI) platform. A patch managing system may be a system which is utilized by an organization or an enterprise to monitor one or more virtual appliances (also referred as virtual machines/virtual desktops) of the enterprise that are hosted on the VDI platform, and one or more IT services provided by virtual appliances of the VDI platform. In some embodiments, the patch managing system may perform the monitoring in order to understand evergreening requirement i.e. requirement for evergreening of the one or more infrastructures and the one or more IT services, such that, the patch managing system may perform dynamic patch management in the VDI platform. In some embodiments, to perform the dynamic patch management, the patch managing system may initially retrieve operational data and vulnerability remediation data related to one or more Information Technology (IT) services and one or more infrastructures of a VDI platform. In some embodiments, the operational data may include, but not limited to, a list of one or more available infrastructures of the VDI platform, information related to operating system patching levels, one or more dependencies of applications of the VDI platform used by the one or more available infrastructures or used for providing the one or more IT services, one or more versions of the applications in each of a plurality of environments, locations of the VDI platform, and a list of sources including the vulnerability remediation data. In some embodiments, the vulnerability remediation data may include, but not limited to, information of one or more latest patches applicable for at least one of, the one or more IT services and the one or more infrastructures of the VDI platform, a list of vulnerabilities of the one or more latest patches along with associated risks and impact, and one or more remediation steps to manage the vulnerabilities. Based on the operation data, vulnerability remediation data and a corresponding industrial standard, the patch managing system may detect a gap in patching level that helps in rolling out one or more patches for the one or more IT services and the one or more infrastructures of the VDI platform. In some embodiments, the patch managing system may further determine a patch prediction score that facilitates in identifying a probability of rolling back the one or more patches rolled out for patching earlier. Based on the patch prediction score, the patch managing system may execute a plan to optimally patch the one or more patches to the one or more IT services and the one or more infrastructures of a VDI platform. In some embodiments, the patch managing system may execute the plan using the one or more patching rules.

In some embodiments, determining the patch prediction score in the present disclosure helps in understanding the patches that need to be rolled out or need to be updated based on requirement, which in turn helps in optimally managing the patching activity seamlessly without affecting the end users. Such optimal patch planning keeps business critical services, infrastructures, and applications up to date with latest versions of the patches, without shutting down virtual machines that are part of the infrastructure of the VDI platform, thus completely eliminating the user downtime or interruption to the work of the user. Also, since the latest versions of the software patches are patched seamlessly, the present disclosure eliminates cyberattacks on the IT services or the infrastructure of the VDI platform.

Overall, the present disclosure ensures seamless and optimal planning of patching activity in the VDI platform, that improves the user experience, work productivity, and prevents business loss that may occur due to shutdown of virtual machines for patching during working hours, and due to cyberattacks if the patching activity is not performed on time. Also, the In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary architecture for performing dynamic patch management in a Virtual Desktop Infrastructure (VDI) platform in accordance with some embodiments of the present disclosure.

The architecture 100 includes end user $101_1$ to end user $101_n$ (also referred to as one or more end users 101), computing device $103_1$ to computing device $103_n$ (also referred to as one or more computing devices 103), a Virtual Desktop Infrastructure (VDI) platform 105, a patch managing system 107, first data source $109_1$ to first data source $109_n$ (also referred to as one or more first data sources 109), and second data source $111_1$ to second data source $111_n$ (also referred to as one or more second data sources 111). The one or more end users 101 may be associated with the VDI platform 105 via a communication network (not shown in the FIG. 1), using the corresponding one or more computing devices 103. As an example, the one or more computing devices 103 may be a mobile phone, a laptop, a desktop, a tablet phone and the like. The communication network may be a wireless communication network. In some embodiments, the VDI platform 105 provides one or more Information Technology (IT) services and one or more infrastructures that enable the one or more end users 101 to access the VDI platform 105 through their corresponding one or more computing devices 103. In some embodiments, the one or more infrastructures of the VDI platform 105 may include multiple resources such as virtual desktops/virtual machines/virtual appliances that are configured with applications of an enterprise that uses the one or more infrastructures of the VDI platform 105. In some embodiments, the VDI platform 105 may be associated with the patch managing system 107 via the communication network. In some other embodiments, the patch managing system 107 may be configured within the VDI platform 105 as part of the one or more infrastructures of the VDI platform 105. The patch managing system 107 may be associated with the one or more first data sources 109 and the one or more second data sources 111 via the communication network. In some embodiments, the one or more first data sources 109 may include, but not limited to, the one or more IT services and the one or more infrastructures of the VDI platform 105. In some embodiments, the one or more second data sources 111 may include, but not limited to, operating system manufacturers and web sites of companies that protect software from malware, such as a web site of an antivirus company.

The patch managing system 107 may include a processor 113, an Input/Output (I/O) interface 115 and a memory 117. The I/O interface 115 may retrieve operational data from the one or more first data sources 109 associated with the patch managing system 107. As an example, the operational data may include, but not limited to, a list of one or more available infrastructures of the VDI platform 105, information related to operating system patching levels, one or more dependencies of applications of the VDI platform 105 used by the one or more available infrastructures or used for providing the one or more IT services, one or more versions of the applications in each of a plurality of environments, locations of the VDI platform 105, and a list of the one or more second data sources 111 including a vulnerability remediation data. In some embodiments, the I/O interface 115 may further retrieve the vulnerability remediation data from the one or more second data sources 111. As an example, the vulnerability remediation data may include, but not limited to, information of one or more latest patches applicable for at least one of, the one or more IT services and the one or more infrastructures of the VDI platform 105, a list of vulnerabilities of one or more latest patches along with associated risks and impact, and one or more remediation steps to manage the vulnerabilities. In some embodiments, the I/O interface 115 may retrieve the vulnerability remediation data using at least one web scraping technique. In some embodiments, the retrieved operational data and the vulnerability data may be stored in the memory 117.

Upon retrieving the operational data and the vulnerability remediation data, the processor 113 may detect a gap in patching level based on the operational data, the vulnerability remediation data and a corresponding industrial standard. In some embodiments, the processor 113 may detect the gap in the patching level across each of a plurality of layers and each of the plurality of environments of the VDI platform 105. As an example, the plurality of layers may refer to one of firmware, hypervisor, operating system and application layer. As an example, the plurality of environments may refer to one of a development environment, a testing environment, a quality assurance-checking environment and a production environment. In some embodiments, the processor 113 may roll out one or more patches for patching at least one of, the one or more IT services and the one or more infrastructures of the VDI platform 105 based on the detected gap in the patching level. In some embodiments, the processor 113 may determine a patch prediction score based on one or more prediction parameters. The patch prediction score may facilitate in identifying a probability of rolling back the one or more patches that are rolled out for patching at least one of the one or more IT services and the one or more infrastructures of the VDI platform 105. As an example, the one or more prediction parameters may include, but not limited to, a size of a patch package, number of reboots required, number of dependent patch packages, uninstalling requirement of legacy software, a gap between patch package release date and current date, severity level of the one or more patches, impact of rolling out the one or more patches, type of the one or more patches, the gap in the patching level, and working hours and workload of an end user 101 of the one or more IT services and/or the one or more infrastructures. In some embodiments, the processor 113 may perform real-time monitoring to record dynamic values associated with the one or more prediction parameters. In some embodiments, the processor 113 may generate a plan based on the patch prediction score. The plan thus generated may be executed by the processor 113 to optimally patch the one or more patches to the one or more IT services and/or the one or more infrastructures of the VDI platform 105, based on one or more patching rules. In some embodiments, the one or more patching rules may be related to, but not limited to, time interval for rolling out the one or more patches, downtime involved in patching, utilization pattern and utilization rate of one or more resources of the VDI platform 105 by an end user 101, and an organization providing the one or more resources.

Figure 2A:
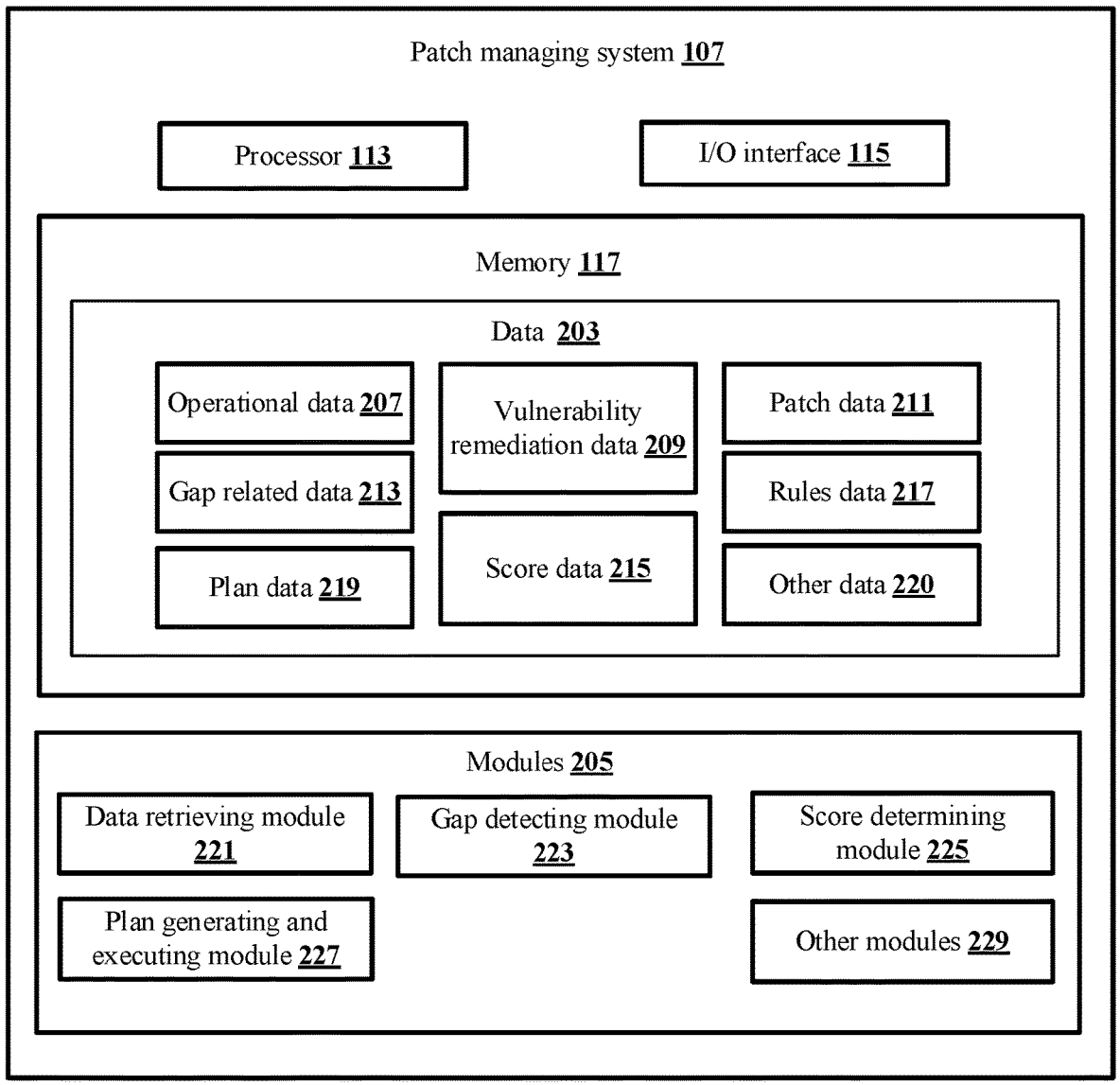
FIG. 2A shows a detailed block diagram of a patch managing system for performing dynamic patch management in a Virtual Desktop Infrastructure (VDI) platform in accordance with some embodiments of the present disclosure.

FIG. 2A shows a detailed block diagram of a patch managing system for performing dynamic patch management in a Virtual Desktop Infrastructure (VDI) platform in accordance with some embodiments of the present disclosure.

In some implementations, the patch managing system 107 may include data 203 and modules 205. As an example, the data 203 is stored in the memory 117 configured in the patch managing system 107 as shown in the FIG. 2A. In one embodiment, the data 203 may include operational data 207, vulnerability remediation data 209, patch data 211, gap related data 213, score data 215, rules data 217, plan data 219 and other data 220.

In some embodiments, the data 203 may be stored in the memory 117 in the form of various data structures. Additionally, the data 203 can be organized using data models, such as relational or hierarchical data models. The other data 220 may store data, including temporary data and temporary files, generated by the modules 205 for performing the various functions of the patch managing system 107.

In some embodiments, the operational data 207 may be data which provides information related to various operations that occur in the VDI platform 105 and elements that help in performing such operations. As an example, the operational data 207 may include, but not limited to, a list of one or more available infrastructures of the VDI platform 105, information related to operating system patching levels, one or more dependencies of applications of the VDI platform 105 used by the one or more available infrastructures or used for providing one or more IT services, one or more versions of the applications in each of a plurality of environments, locations of the VDI platform 105, and a list of the one or more second data sources 111 including the vulnerability remediation data 209.

In some embodiments, the vulnerability remediation data 209 may be data that provides information related to popular vulnerabilities associated with patches that are used for patching the one or more IT services and the one or more infrastructures in the VDI platform 105 and remediations for issues caused by such popular vulnerabilities. As an example, the vulnerability remediation data 209 may include, but not limited to, information of one or more latest patches applicable for at least one of, the one or more IT services and the one or more infrastructures of the VDI platform 105, a list of vulnerabilities of the one or more latest patches along with associated risks and impact, and one or more remediation steps to manage the vulnerabilities. In some embodiments, the patch managing system 107 may build metadata required for performing dynamic patching, based on the vulnerability remediation data 209.

In some embodiments, the patch data 211 may include one or more latest patches for the one or more IT services and the one or more infrastructures of the VDI platform 105 and data associated with the one or more latest patches. As an example, data associated with the one or more latest patches may include, but not limited to, model, software application to which a patch is applicable, file name, patch type, patch version, data of release of the patch, upgrade requirement for the software application with the patch, operating system compatible with the patch, installation instructions, previously available patch version, previous upgradation date, previously upgraded patch version, known issues associated with the previous patch versions and latest patch versions, dependent applications i.e. applications which get affected due to the upgrading or patching of the main software and the like. FIG. 2B shows a table indicating exemplary patch data in accordance with some embodiments of the present disclosure.

In some embodiments, the gap related data 213 may include information related to gaps in the patching level detected by the patch managing system 107. In some embodiments, the gap may be identified between the operational data 207 which is available on-ground and the vulnerability remediation data 209 that is reported by external reporting services such as an operating system manufacturer and websites of companies that protect software from malware. As an example, the gap related data 213 may include existing version of software applications used by the one or more IT services and the one or more infrastructures of the VDI platform 105, features provided by the existing version of the software applications, features/updates provided by one or more latest patches that are detected to be appropriate for the software applications, and amount of gap or amount of difference between features of the existing version of the software applications and corresponding one or more latest patches that are available for patching.

In some embodiments, the score data 215 may include a patch prediction score determined based on one or more prediction parameters. In some embodiments, the patch prediction score may indicate a probability of rolling back the one or more patches rolled out for patching at least one of, the one or more IT services and the one or more infrastructures of the VDI platform 105.

In some embodiments, the rules data 217 may include one or more patching rules used for generating and executing a plan for optimally patching the one or more patches to the one or more IT services and the one or more infrastructures of the VDI platform 105. In some embodiments, the one or more patching rules may be related to at least one of time interval for rolling out the one or more patches, downtime involved in patching, utilization pattern and utilization rate of one or more resources of the VDI platform 105 by one or more end users 101, and organization providing the one or more resources. Tables shown in FIGS. 2C, 2D and 2E indicate exemplary patching rules used for generating and executing the plan for patching the one or more patches. FIG. 2C indicates exemplary patching rules for upgrading firmware, FIG. 2D indicates exemplary patching rules for upgrading Hypervisor and FIG. 2E indicates exemplary patching rules for upgrading an application.

In some embodiments, the plan data 219 may include the plan generated by the patch managing system 107 which is executed in the VDI platform 105 for optimally patching the one or more patches to the one or more IT services and the one or more infrastructures of the VDI platform 105.

In some embodiments, the data 203 stored in the memory 117 may be processed by the modules 205 of the patch managing system 107. The modules 205 may be stored within the memory 117. In an example, the modules 205 communicatively coupled to the processor 113 configured in the patch managing system 107, may also be present outside the memory 117 as shown in FIG. 2A and implemented as hardware. As used herein, the term modules 205 may refer to an Application Specific Integrated Circuit (ASIC), an electronic circuit, a processor (shared, dedicated, or group) and memory that execute one or more software or firmware programs, a combinational logic circuit, and/or other suitable components that provide the described functionality.

In some embodiments, the modules 205 may include, for example, a data retrieving module 221, a gap detecting module 223, a score determining module 225, a plan generating and executing module 227 and other modules 229. The other modules 229 may be used to perform various miscellaneous functionalities of the patch managing system 107. It will be appreciated that such aforementioned modules 205 may be represented as a single module or a combination of different modules.

In some embodiments, the data retrieving module 221 may retrieve the operational data 207 from one or more first data sources 109. The operational data 207 and the vulnerability remediation data 209 may be related to at least one of, one or more Information Technology (IT) services and one or more infrastructures of a VDI platform 105. In some embodiments, the one or more first data sources 109 may include, but not limited to, the one or more IT services and the one or more infrastructures of the VDI platform 105. In some embodiments, the one or more second data sources 111 may include, but not limited to, operating system manufacturers and websites of companies that protect software from malware, such as a website of an antivirus company. In some embodiments, the data retrieving module 221 may retrieve the operational data 207 with an intention of understanding hardware assets of the VDI platform 105, software and the versions of the software installed, prior patches applied at different layers of the VDI platform 105 and the like. In some embodiments, such operational data 207 may be captured by monitoring computing environment, storage, network usage, thermal values, software features used or being used, time series logs of services and operating systems from different deployments of the VDI platform 105 of same architecture and the like, belonging to the one or more IT services and the one or more infrastructures of the VDI platform 105. Further, the data retrieving module 221 may retrieve the vulnerability remediation data 209 from one or more second data sources 111. The vulnerability remediation data 209 may be related to at least one of, one or more Information Technology (IT) services and one or more infrastructures of a VDI platform 105. In some embodiments, the vulnerability remediation data 209 may provide all information related to latest vulnerabilities associated with the patches and software applications updated with patches, and their corresponding remediation data from publicly available websites. In some embodiments, the data retrieving module 221 may retrieve the vulnerability remediation data 209 using at least one web scraping technique.

In some embodiments, the gap detecting module 223 may detect a gap in patching level based on the operational data 207, the vulnerability remediation data 209 and a corresponding industrial standard. The gap detecting module 223 may detect the gap in the patching level by comparing the operational data 207 of each of the one or more IT services and the one or more infrastructures of the VDI platform 105 with the corresponding vulnerability remediation data 209, with respect to the corresponding industrial standard. In some embodiments, such gap in the patching level may be detected across each of a plurality of layers and each of a plurality of environments of the VDI platform 105. As an example, the plurality of layers may include, but not limited to, firmware, hypervisor, operating system and application layer. As an example, the plurality of environments may include, but not limited to, a development environment, a testing environment, a quality assurance-checking environment and a production environment. In some embodiments, detecting the gap in the patching level of the one or more infrastructures and one or more IT services may also include checking enterprise's Source Code Configuration Management (SCCM) tools and IT Service Management (ITSM) tools for newer versions of patches which are available in the development, the quality assurance and the production environment. In some embodiments, the gap detecting module 223 may detect the gap in the patching level in order to roll out one or more patches for patching at least one of the one or more IT services and the one or more infrastructures of the VDI platform 105 based on the detected gap in the patching level.

In some embodiments, the score determining module 225 may determine a patch prediction score based on one or more prediction parameters. The patch prediction score may facilitate in identifying a probability of rolling back the one or more patches that are rolled out for patching at least one of, the one or more IT services and the one or more infrastructures of the VDI platform 105. In some embodiments, the one or more prediction parameters used for predicting the patch prediction score may include, but not limited to, a size of a patch package, number of reboots required, number of dependent patch packages, uninstalling requirement of legacy software, a gap between patch package release date and current date, age of patch release, severity level of the one or more patches, impact of rolling out the one or more patches, type of the one or more patches, the gap in the patching level, and working hours and workload of an end user 101 of the one or more IT services and/or the one or more infrastructures. In some embodiments, the score determining module 225 may record dynamic values associated with the one or more prediction parameters based on real-time monitoring. In some embodiments, the score determining module 225 may determine the patch prediction score based on a predefined weightage assigned to each of the one or more prediction parameters based on dynamic values of the one or more prediction parameters and a predefined weightage associated with each of a plurality of layers at which the dynamic values of the one or more prediction parameters are recorded. FIG. 2F shows a table indicating exemplary scores and weightages assigned to different prediction parameters and different layers respectively, in accordance with some embodiments of the present disclosure. As shown in the FIG. 2F, exemplary weightage of firmware layer is 10%, Hypervisor layer is 40%, Virtual Machine (VM) Operating System (OS) layer is 30% and Application layer is 20%. Similarly, for each prediction parameter, an individual exemplary predefined weightage is indicated. For instance, if a single reboot is required for installing the patch, then the weightage assigned for the prediction parameter "Reboot Score" would be 50. Similarly, if a multiple reboots are required for installing the patch, then the weightage assigned for the prediction parameter "Reboot Score" would be 20. Further, for instance, if the type of patch is stand alone, then the weightage assigned to the prediction parameter "Type of Patch" would be 100. Furthermore, for instance, if the severity level of patch (in other words, criticality requirement of patch) is medium, then the weightage assigned to the prediction parameter "Severity level of patch" would be 50. Similarly, weightage is assigned for each prediction parameter as shown in the FIG. 2F, in accordance with the predefined weightages associated with each prediction parameter. Thereafter, the score determining module 225 may determine a cumulative score by correlating the individual weightages assigned to each prediction parameter based on the dynamic values, and the weightage assigned to the layer from which the dynamic values of the one or more prediction parameters are recorded. The cumulative score thus determined by the score determining module 225 is the patch prediction score. In some embodiments, based on the determined patch prediction score, the score determining module 225 may rollback one or more patches which were earlier rolled out for patching. As an example, if the patch prediction score is less than a predefined threshold, then the score determining module 225 may rollback one or more patches. For instance, the patch prediction score may be considered based on predefined threshold ranges. As an example, consider an overall scale of the patch prediction score is 10. If the patch prediction score is determined to be in the predefined range of 8 to 10, then the patch prediction score is considered to be close to the final value 10 and hence success of patching would be considered to be high and does not require any rollback of patches. If the patch prediction score is determined to be in the predefined range of 5 to 8, then it is considered to have low probability of failure, but requires backup, hence patching can be performed during non-peak hours. If the patch prediction score is determined to be in the predefined range of 3 to 5, then it is considered to have moderate probability of failure, but requires backup and standby servers, hence patching can be performed during weekends. If the patch prediction score is determined to be in the predefined range of 0 to 2, then it is considered to have high probability of failure, and requires a standby, backup and restore mechanism. Hence, patching may require special downtime. In such cases, the patches may be rolled back until the special downtime is planned. Similarly, any other predefined strategy may be applied on the patch prediction score to understand whether there is a requirement to roll back one or more patches. For instance, weightage of individual patch parameters may be considered instead of the cumulative score, i.e. the patch prediction score. For example, if the weightage of individual patch parameters such as "Dependent patch package length", "gap to be updated" and "Reboot score" indicate low values, which mean that, length of dependent patch package is more than 20, gap to be updated is nearly upto 5 patch levels, and requires multiple rebooting, then such patching may require more time than normal patching process due to the weightage. Therefore, in such circumstances, the patch may be temporarily rolled back and rolled out for patching process during a time when the working hours are over, for instance at midnight, so that, end user's work remain uninterrupted during the day. In some other embodiments, rolling back of the one or more patches may be predicted based on a combination of factors such as size of patch package to be patched, working hours of the one or more end users 101, workload of the one or more end users 101, requirement of the patch package and the like.

FIG. 2G shows a table with exemplary values that indicate need for performing one or more actions at different layers for patch management, in accordance with some embodiments of the present disclosure. As an example, the one or more actions indicated in the FIG. 2G are installing a patch, uninstalling a patch, rebooting, rolling back steps required to rollback a patch, severity level of the patch, action required to fill the gap detected in the patching level detected and the like. As shown in the FIG. 2G, for the layer "Firmware", there is no requirement of uninstalling any earlier patches, there is a requirement for installing patches indicated as I1, I2 and I3, there is requirement for Rebooting which is indicated using the step R1, there is a requirement to perform testing upon installing the patch and the test cases required for testing are indicated as T1 and T2, there is a requirement to rollback the installation of the patch I1 which is indicated by RB1, the severity level of the patch is indicated as "High", and there is a requirement to perform an action to fill the gaps in the patching level. The action is to install the patches I1, I2 and I3 as shown in the FIG. 2G. Similarly, exemplary actions are provided for the layer "VM OS" as well in the FIG. 2G.

In some embodiments, the plan generating and executing module 227 may generate a plan to optimally patch the one or more patches to the one or more IT services and the one or more infrastructures of the VDI platform 105. In some embodiments, the plan generating and executing module 227 may generate the plan based on the patch prediction score. Upon generating the plan, the plan generating and executing module 227 may execute the plan based on the one or more patching rules, to optimally patch the one or more patches to the one or more IT services and the one or more infrastructures of the VDI platform 105. In some embodiments, the one or more patching rules may be related to at least one of time interval for rolling out the one or more patches, downtime involved in patching, utilization pattern and utilization rate of one or more resources of the VDI platform 105 by an end user 101, and organization providing the one or more resources. FIGS. 2C, 2D and 2E indicate exemplary patching rules used for generating and executing the plan for patching the one or more patches. FIG. 2C indicates exemplary patching rules for upgrading firmware, FIG. 2D indicates exemplary patching rules for upgrading Hypervisor and FIG. 2E indicates exemplary patching rules for upgrading an application. In some embodiments, the question context, for instance, A11, A12, B11 as shown in the FIGS. 2C, 2D and 2E, which is provided as part of conclusion of a predefined rule may be a contextual input which enables the plan generating and executing module 227 to arrive at a conclusion or a decision when there is an ambiguity to identify whether patching is required or not at Firmware level. Based on such conclusion, the plan generating and executing module 227 may generate or modify the optimal plan for execution. As an example, one of the exemplary rules in FIG. 2C indicates that, when the following is the condition,
Service ID=Data Given
Frame type (layer type)=Data given: Firmware
Firmware name: Data not given
Patch Date: Data not given
Threshold=Data given: 1
then, conclusion would be:
Missing field=PatchDate_Q1
Theme context=101
Question context=A12

As an example, one of the exemplary rules in FIG. 2D indicates that, when the following is the condition:
Service ID=Data Given
Frame type (layer type)=Data given: Hypervisor
Previous Question: Data given: Is the firmware updated?
Affirmative: Data given: Yes
Positive feature: Data not given
Negation: Data given
Hypervisor Patch name: Data not given
Patch date: Data not given
Threshold=Data not given
then, conclusion would be:
Missing field=Firmware Validation Edit
Theme context=201
Question context=C14

As an example, one of the exemplary rules in FIG. 2E indicates that, when the following is the condition:
Service ID=Data Given
Frame type (layer type)=Data given: Application
Previous Question: Data given: Is the hypervisor updated?
Affirmative: Data given: Yes
Positive feature: Data given
Negation: Data given
Service name: Data not given
Application patch name: Data not given
Application Patch release date: Data not given
Threshold=Data not given
then, conclusion would be:
Missing field=Hypervisor Validation Edit
Theme context=301
Question context=C14

Each of the values of the conclusion such as Patchdate_Q1, 101 and A12, Firmware Validation edit, 201 and C14, and Hypervisor Validation Edit, 301 and C14 may have a predefined meaning. Similarly, many exemplary patch rules have been defined in FIGS. 2C, 2D and 2E. Therefore, based on such one or more patching rules that are predefined, the plan generating and executing module 227 may execute the plan to optimally patch the one or more patches to the one or more IT services and the one or more infrastructures of the VDI platform 105.

In some embodiments, optimally patching the one or more patches to the one or more IT services and the one or more infrastructures of the VDI platform 105 may include ensuring that the patching process does not interrupt the utilization pattern of the VDI platform 105 by the one or more end users 101, in other words, does not interrupt working hours of the one or more end users 101. In some other embodiments, optimally patching the one or more patches to the one or more IT services and the one or more infrastructures of the VDI platform 105 may include ensuring that the patching process results in minimum downtime or zero downtime, by rolling out the one or more patches within a small window of time interval for the patching process. In yet other embodiments, optimally patching the one or more patches to the one or more IT services and the one or more infrastructures of the VDI platform 105 may include ensuring that the utilization rate within the VDI platform 105 is not affected for the one or more end users 101 due to the patching process. In yet other embodiments, optimally patching the one or more patches to the one or more IT services and the one or more infrastructures of the VDI platform 105 may include ensuring that minimal resources and time are used in detecting the required patches and in closing the gap detected in the patching level by performing the patching process. Similarly, other parameters of the VDI platform 105 may be considered for optimally patching the one or more patches to the one or more IT services and the one or more infrastructures of the VDI platform 105.

Additionally, the patch managing system 107 may provide one or more recommendations related to resource usage, resource reallocation and the like, based on a detailed monitoring and learning. In the present disclosure, the patch managing system 107 may monitor data related to the VDI platform 105 continuously or periodically, and learn a pattern such as processes that are running at regular intervals of time, frequently used applications, who accesses which applications, at what part of the day, week, month and a year usage of the application is high, low and medium, who uses the applications heavily at regular intervals, for example one or more end users 101 in data centres, and the like. As an example, the pattern learnt by the patch managing system 107 may be, processes such as payroll processing are performed at the end of every month, processes such as performance appraisals are performed at the end of the fiscal year, which means that, applications related to performance appraisal would be used heavily by certain one or more end users 101 only at the end of the fiscal year. Similarly, processes such as attendance processing are performed on a daily basis, weekly vendor payments are performed on a weekly basis, monthly employment payroll are performed on a monthly basis, and the like. Similarly the patch managing system 107 may also learn the application and end user related data by performing daily/weekly antivirus scanning, daily backups, analysis of peak usage of conference application during peak hours and the like. Upon learning the pattern, the patch managing system 107 may be able to segregate workloads into real-time workloads, offline workloads and their configurations like real-time conferencing, backup jobs, batch processing and the like. Also, the patch managing system 107 may be able to identify seasonal applications based on dynamic nature of business. As an example, a global consumer company may have an ice cream business and coffee business, where coffee business applications may be used heavily in winter season, while ice-cream business related applications may be used heavily during summer season. Therefore, based on such learnings, the patch managing system 107 may be able to provide additional recommendations such as providing more resources to the data centre for real-time applications during business hours of the day and allocating/repurposing the resources to offline applications like backup applications during off-peak hours. Similarly based on the seasonal nature of the applications, recommendation may be provided such as to allocate less resources to ice-cream business during winter and more resources to coffee business during winter, and vice versa during summer. Therefore, the present disclosure helps one or more end users 101 to effectively utilize their resources in places such as data centres by dynamic allocation of resources to the applications and one or more end users 101 who need them on priority at any given point of time. This in turn helps in eliminating under utilization of applications and resources by dynamically provisioning and de-provisioning the applications and resources based on demand determined using historical demand information and real-time monitoring. In some embodiments, such monitoring and learning of patterns may also be used in generating and executing the plan optimally for patching the one or more patches to the one or more IT service and one or more infrastructures of the VDI platform 105.

Figure 3:
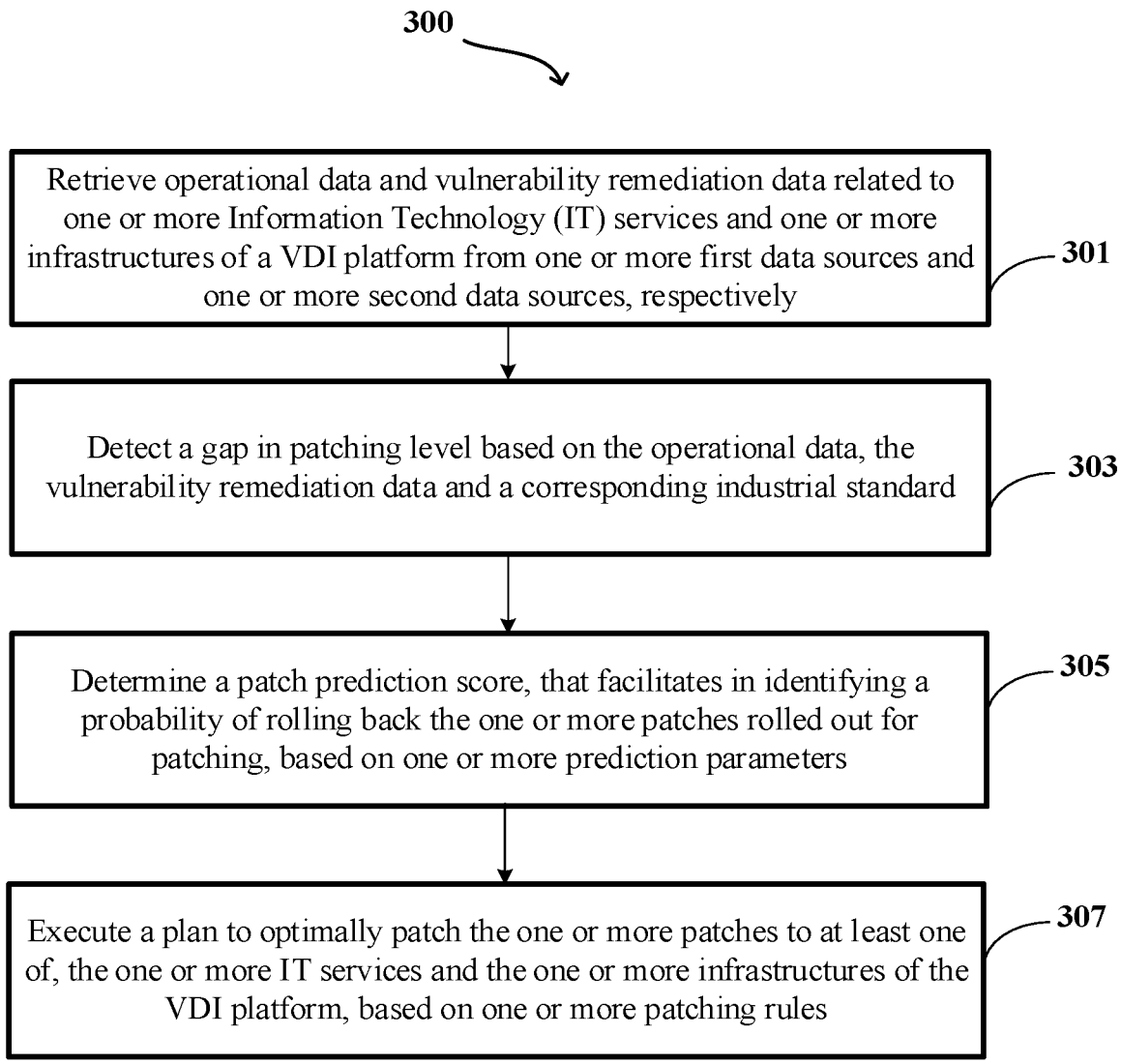
FIG. 3 shows a flowchart illustrating a method of performing dynamic patch management in a Virtual Desktop Infrastructure (VDI) platform in accordance with some embodiments of the present disclosure.

FIG. 3 shows a flowchart illustrating method of performing dynamic patch management in a Virtual Desktop Infrastructure (VDI) platform in accordance with some embodiments of the present disclosure.

As illustrated in FIG. 3, the method 300 comprises one or more blocks illustrating a method of performing dynamic patch management in a Virtual Desktop Infrastructure (VDI) platform 105. The method 300 may be described in the general context of computer executable instructions. Generally, computer executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 301, the method 300 may include retrieving, by a processor 113 of a patch managing system 107, operational data 207 from one or more first data sources 109 and vulnerability remediation data 209 from one or more second data sources 111. In some embodiments, the operational data 207 and the vulnerability remediation data 209 may be related to one or more Information Technology (IT) services and one or more infrastructures of a VDI platform 105. As an example, the operational data 207 may include, but not limited to, a list of one or more available infrastructures of the VDI platform 105, information related to operating system patching levels, one or more dependencies of applications of the VDI platform 105 used by the one or more available infrastructures or used for providing the one or more IT services, one or more versions of the applications in each of a plurality of environments, locations of the VDI platform 105, and a list of the one or more second data sources comprising the vulnerability remediation data 209. As an example, the vulnerability remediation data 209 may include information of one or more latest patches applicable for at least one of, the one or more IT services and the one or more infrastructures of the VDI platform 105, a list of vulnerabilities of the one or more latest patches along with associated risks and impact, and one or more remediation steps to manage the vulnerabilities.

At block 303, the method 300 may include detecting, by the processor 113, a gap in patching level based on the operational data 207, the vulnerability remediation data 209 and a corresponding industrial standard. In some embodiments, the processor 113 may detect the gap in the patching level by comparing the operational data 207 of each of the one or more IT services and the one or more infrastructures of the VDI platform 105 with the corresponding vulnerability remediation data 209, with respect to the corresponding industrial standard, across each of a plurality of layers and each of a plurality of environments of the VDI platform 105. In some embodiments, the processor 113 may roll out one or more patches for patching at least one of, the one or more IT services and the one or more infrastructures of the VDI platform 105 based on the detected gap in the patching level.

At block 305, the method 300 may include determining, by the processor 113, a patch prediction score based on one or more prediction parameters. In some embodiments, the patch prediction score facilitates in identifying a probability of rolling back the one or more patches rolled out for patching at least one of, the one or more IT services and the one or more infrastructures of the VDI platform 105. In some embodiments, the processor 113 may determine the patch prediction score based on a predefined weightage assigned to each of the one or more prediction parameters based on dynamic values of the one or more prediction parameters and a predefined weightage associated with each of a plurality of layers at which the dynamic values of the one or more prediction parameters are recorded.

At block 305, the method 300 may include executing, by the processor 113, a plan to optimally patch the one or more patches to at least one of, the one or more IT services and the one or more infrastructures of the VDI platform 105, based on one or more patching rules. In some embodiments, the processor 113 may generate the plan for optimal patching based on the patch prediction score, and execute based on the one or more patching rules that may be related to at least one of time interval for rolling out the one or more patches, downtime involved in patching, utilization pattern and utilization rate of one or more resources of the VDI platform 105 by one or more end users 101, and organization providing the one or more resources.

Figure 4:
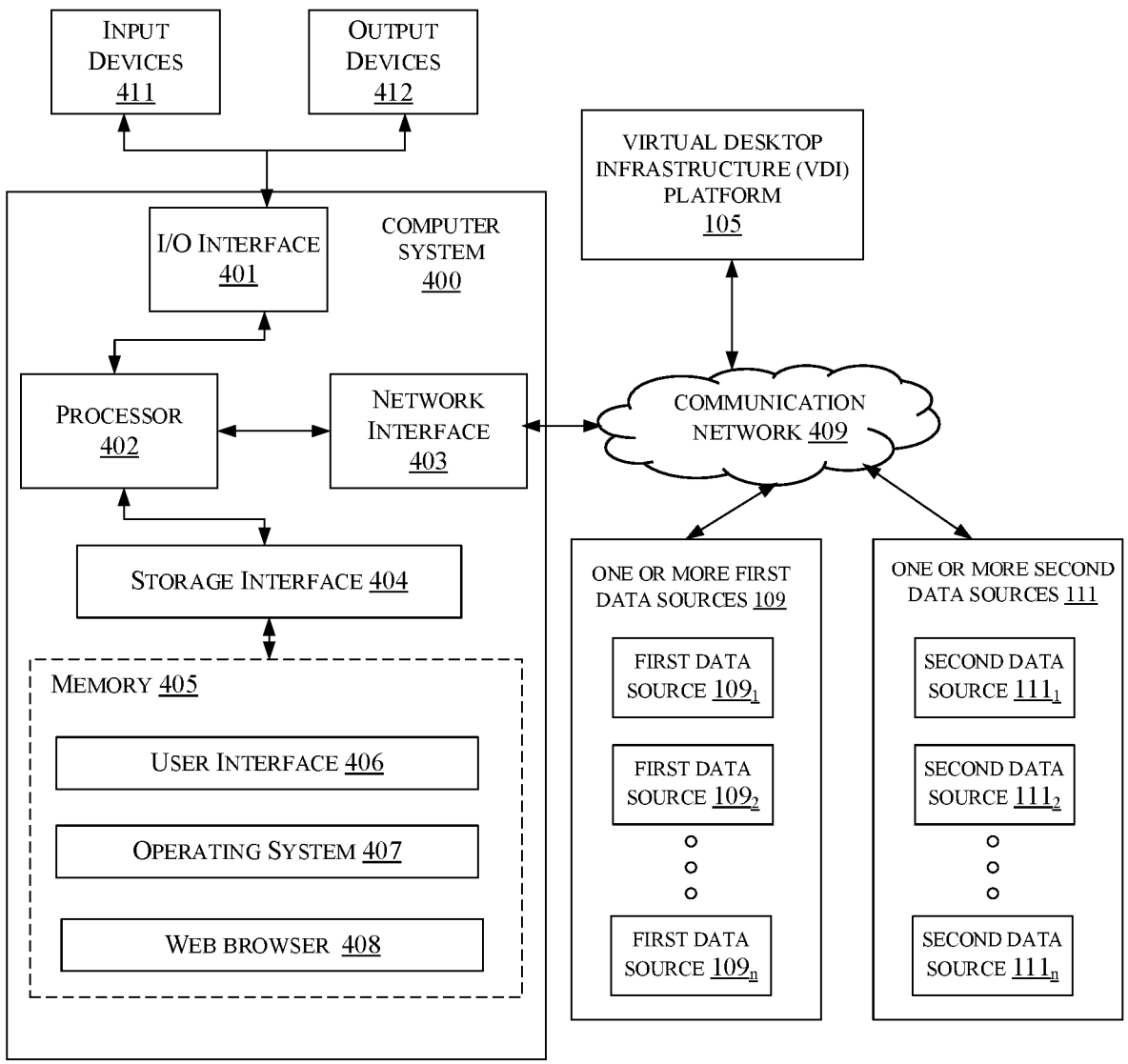
FIG. 4 is a block diagram of an exemplary computer system for implementing embodiments consistent with the present disclosure.

FIG. 4 is a block diagram of an exemplary computer system for implementing embodiments consistent with the present disclosure.

In some embodiments, FIG. 4 illustrates a block diagram of an exemplary computer system 400 for implementing embodiments consistent with the present invention. In some embodiments, the computer system 400 can be a patch managing system 107 to performing dynamic patch management in a Virtual Desktop Infrastructure (VDI) platform 105. The computer system 400 may include a central processing unit ("CPU" or "processor") 402. The processor 402 may include at least one data processor for executing program components for executing user or system-generated business processes. A user may include a person, a person using a device such as those included in this invention, or such a device itself. The processor 402 may include specialized processing units such as integrated system (bus) controllers, memory management control units, floating point units, graphics processing units, digital signal processing units, etc.

The processor 402 may be disposed in communication with input devices 411 and output devices 412 via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n /b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, computer system 400 may communicate with input devices 411 and output devices 412.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with a VDI platform 105, first data source $109_1$ to first data source $109_n$ (also referred to as one or more first data sources 109), and second data source $111_1$ to second data source $111_n$ (also referred to as one or more second data sources 111). The communication network 409 can be implemented as one of the different types of networks, such as intranet or Local Area Network (LAN), Closed Area Network (CAN) and such. The communication network 409 may either be a dedicated network or a shared network, which represents an association of the different types of networks that use a variety of protocols, for example, Hypertext Transfer Protocol (HTTP), CAN Protocol, Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 408 etc. In some embodiments, the computer system 400 may store user/application data, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM®OS/2®, MICROSOFT® WINDOWS® (XP®, VISTA®/7/8, 10 etc.), APPLE® IOS®, GOOGLE™ ANDROID™, BLACKBERRY® OS, or the like. The User interface 406 may facilitate display, execution, interaction, manipulation, or operation of program components through textual or graphical facilities. For example, user interfaces may provide computer interaction interface elements on a display system operatively connected to the computer system 400, such as cursors, icons, checkboxes, menus, scrollers, windows, widgets, etc. Graphical User Interfaces (GUIs) may be employed, including, without limitation, Apple® Macintosh® operating systems' Aqua ®, IBM® OS/2®, Microsoft® Windows® (e.g., Aero, Metro, etc.), web interface libraries (e.g., ActiveX®, Java®, Javascript®, AJAX, HTML, Adobe® Flash® etc.), or the like.

In some embodiments, the computer system 400 may implement the web browser 408 stored program components. The web browser 408 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, ADOBE® FLASH®, JAVASCRIPT®, JAVA®, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for performing dynamic patch management in a Virtual Desktop Infrastructure (VDI) platform. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

| Referral numerals | |
| --- | --- |
| Reference Number | Description |
| 100 | Architecture |
| 101 | One or more end users |
| 103 | One or more computing devices |
| 105 | Virtual Desktop Infrastructure (VDI) Platform |
| 107 | Patch managing system |
| 109 | One or more first data sources |
| 111 | One or more second data sources |
| 113 | Processor |
| 115 | I/O interface |
| 117 | Memory |
| 203 | Data |
| 205 | Modules |
| 207 | Operational data |
| 209 | Vulnerability remediation data |
| 211 | Patch data |
| 213 | Gap related data |
| 215 | Score data |
| 217 | Rules data |
| 219 | Plan data |
| 220 | Other data |
| 221 | Data retrieving module |
| 223 | Gap detecting module |
| 225 | Score determining module |
| 227 | Plan generating and executing module |
| 229 | Other modules |
| 400 | Exemplary computer system |
| 401 | I/O Interface of the exemplary computer system |
| 402 | Processor of the exemplary computer system |
| 403 | Network interface |
| 404 | Storage interface |
| 405 | Memory of the exemplary computer system |
| 406 | User interface |

-continued

Referral numerals

| Reference Number | Description |
| --- | --- |
| 407 | Operating system |
| 408 | Web browser |
| 409 | Communication network |
| 411 | Input devices |
| 412 | Output devices |

We claim:

1. A method of performing dynamic patch management in a Virtual Desktop Infrastructure (VDI) platform, the method comprising:
retrieving, by a patch managing system, operational data from one or more first data sources and vulnerability remediation data from one or more second data sources, wherein the operational data and the vulnerability remediation data are related to at least one of, one or more Information Technology (IT) services and one or more infrastructures of a VDI platform;
detecting, by the patch managing system, a gap in patching level based on the operational data, the vulnerability remediation data and a corresponding industrial standard, wherein one or more patches are rolled out for patching at least one of, the one or more IT services and the one or more infrastructures of the VDI platform based on the detected gap in the patching level;
recording, by the patch managing system, dynamic values of one or more prediction parameters based on real-time monitoring of at least one of: one or more Information Technology (IT) services or one or more infrastructures of the VDI platform;
obtaining, by the patch managing system, a predefined weightage associated with each of a plurality of layers at which the dynamic values of the one or more prediction parameters are recorded;
determining, by the patch managing system, a cumulative score by correlating the predefined weightages assigned to each prediction parameter based on the dynamic values, and the weightage assigned to the layer from which the dynamic values of the one or more prediction parameters are recorded;
determining, by the patch managing system, a patch prediction score based on the cumulative score, wherein the patch prediction score facilitates in identifying a probability of rolling back the one or more patches rolled out for patching at least one of, the one or more IT services and the one or more infrastructures of the VDI platform; and
executing, by the patch managing system, a plan to optimally patch the one or more patches to at least one of, the one or more IT services and the one or more infrastructures of the VDI platform, based on one or more patching rules, wherein the plan is generated based on the patch prediction score.

2. The method as claimed in claim 1, wherein the operational data comprises at least one of a list of one or more available infrastructures of the VDI platform, information related to operating system patching levels, one or more dependencies of applications of the VDI platform used by the one or more available infrastructures or used for providing the one or more IT services, one or more versions of the applications in each of a plurality of environments, locations of the VDI platform, and a list of the one or more second data sources comprising the vulnerability remediation data, wherein the vulnerability remediation data comprises at least one of information of one or more latest patches applicable for at least one of, the one or more IT services and the one or more infrastructures of the VDI platform, a list of vulnerabilities of the one or more latest patches along with associated risks and impact, and one or more remediation steps to manage the vulnerabilities.

3. The method as claimed in claim 1, vulnerability remediation data is retrieved using at least one web scraping technique.

4. The method as claimed in claim 1, wherein the one or more second data sources comprise at least one of an operating system manufacturer and websites of companies that protect software from malware.

5. The method as claimed in claim 1, wherein the gap in the patching level is detected by comparing the operational data of each of the one or more IT services and the one or more infrastructures of the VDI platform with the corresponding vulnerability remediation data, with respect to the corresponding industrial standard.

6. The method as claimed in claim 1, wherein the gap in the patching level is detected across each of a plurality of layers and each of a plurality of environments of the VDI platform, wherein the plurality of layers comprises firmware, hypervisor, operating system and application layer, wherein the plurality of environments comprises a development environment, a testing environment, a quality assurance-checking environment and a production environment.

7. The method as claimed in claim 1, wherein the one or more prediction parameters comprises at least one of a size of a patch package, number of reboots required, number of dependent patch packages, uninstalling requirement of legacy software, a gap between patch package release date and current date, severity level of the one or more patches, impact of rolling out the one or more patches, type of the one or more patches, the gap in the patching level, and working hours and workload of an end user of the one or more IT services and/or the one or more infrastructures.

8. The method as claimed in claim 1, wherein the one or more patching rules are related to at least one of time interval for rolling out the one or more patches, downtime involved in patching, utilization pattern and utilization rate of one or more resources of the VDI platform by an end user, and organization providing the one or more resources.

9. A patch managing system for performing dynamic patch management in a Virtual Desktop Infrastructure (VDI) platform, the patch managing system comprising:
a processor; and
a memory communicatively coupled to the processor, wherein the memory stores the processor-executable instructions, which, on execution, causes the processor to:
retrieve operational data from one or more first data sources and vulnerability remediation data from one or more second data sources, wherein the operational data and the vulnerability remediation data are related to at least one of, one or more Information Technology (IT) services and one or more infrastructures of a VDI platform;
detect a gap in patching level based on the operational data, the vulnerability remediation data and a corresponding industrial standard, wherein one or more patches are rolled out for patching at least one of, the one or more IT services and the one or more infrastructures of the VDI platform based on the detected gap in the patching level;

record dynamic values of one or more prediction parameters based on real-time monitoring of at least one of: one or more Information Technology (IT) services or one or more infrastructures of the VDI platform;

obtain a predefined weightage associated with each of a plurality of layers at which the dynamic values of the one or more prediction parameters are recorded;

determine a cumulative score by correlating the predefined weightages assigned to each prediction parameter based on the dynamic values, and the weightage assigned to the layer from which the dynamic values of the one or more prediction parameters are recorded;

determine a patch prediction score based on the cumulative score, wherein the patch prediction score facilitates in identifying a probability of rolling back the one or more patches rolled out for patching at least one of, the one or more IT services and the one or more infrastructures of the VDI platform; and execute a plan to optimally patch the one or more patches to at least one of, the one or more IT services and the one or more infrastructures of the VDI platform, based on one or more patching rules, wherein the plan is generated based on the patch prediction score.

10. The patch managing system as claimed in claim 9, wherein the operational data comprises at least one of a list of one or more available infrastructures of the VDI platform, information related to operating system patching levels, one or more dependencies of applications of the VDI platform used by the one or more available infrastructures or used for providing the one or more IT services, one or more versions of the applications in each of a plurality of environments, locations of the VDI platform, and a list of the one or more second data sources comprising the vulnerability remediation data.

11. The patch managing system as claimed in claim 9, wherein the vulnerability remediation data comprises at least one of information of one or more latest patches applicable for at least one of, the one or more IT services and the one or more infrastructures of the VDI platform, a list of vulnerabilities of the one or more latest patches along with associated risks and impact, and one or more remediation steps to manage the vulnerabilities.

12. The patch managing system as claimed in claim 9, wherein the processor retrieves the vulnerability remediation data using at least one web scraping technique.

13. The patch managing system as claimed in claim 9, wherein the one or more second data sources comprise at least one of an operating system manufacturer and websites of companies that protect software from malware.

14. The patch managing system as claimed in claim 9, wherein the processor detects the gap in the patching level by comparing the operational data of each of the one or more IT services and the one or more infrastructures of the VDI platform with the corresponding vulnerability remediation data, with respect to the corresponding industrial standard.

15. The patch managing system as claimed in claim 9, wherein the processor detects the gap in the patching level across each of a plurality of layers and each of a plurality of environments of the VDI platform, wherein the plurality of layers comprises firmware, hypervisor, operating system and application layer, wherein the plurality of environments comprises a development environment, a testing environment, a quality assurance-checking environment and a production environment.

16. The patch managing system as claimed in claim 9, wherein the one or more prediction parameters comprises at least one of a size of a patch package, number of reboots required, number of dependent patch packages, uninstalling requirement of legacy software, a gap between patch package release date and current date, severity level of the one or more patches, impact of rolling out the one or more patches, type of the one or more patches, the gap in the patching level, and working hours and workload of an end user of the one or more IT services and/or the one or more infrastructures.

17. The patch managing system as claimed in claim 9, wherein the one or more patching rules are related to at least one of time interval for rolling out the one or more patches, downtime involved in patching, utilization pattern and utilization rate of one or more resources of the VDI platform by an end user, and organization providing the one or more resources.

18. A non-transitory computer readable medium including instructions stored thereon that when processed by at least one processor causes the patch managing system to perform operations comprising:

retrieving operational data from one or more first data sources and vulnerability remediation data from one or more second data sources, wherein the operational data and the vulnerability remediation data are related to at least one of, one or more Information Technology (IT) services and one or more infrastructures of a VDI platform;

detecting a gap in patching level based on the operational data, the vulnerability remediation data and a corresponding industrial standard, wherein one or more patches are rolled out for patching at least one of, the one or more IT services and the one or more infrastructures of the VDI platform based on the detected gap in the patching level;

recording dynamic values of one or more prediction parameters based on real-time monitoring of at least one of: one or more Information Technology (IT) services or one or more infrastructures of the VDI platform;

obtaining a predefined weightage associated with each of a plurality of layers at which the dynamic values of the one or more prediction parameters are recorded;

determining a cumulative score by correlating the predefined weightages assigned to each prediction parameter based on the dynamic values, and the weightage assigned to the layer from which the dynamic values of the one or more prediction parameters are recorded;

determining a patch prediction score based on the cumulative score, wherein the patch prediction score facilitates in identifying a probability of rolling back the one or more patches rolled out for patching at least one of, the one or more IT services and the one or more infrastructures of the VDI platform; and executing a plan to optimally patch the one or more patches to at least one of, the one or more IT services and the one or more infrastructures of the VDI platform, based on one or more patching rules, wherein the plan is generated based on the patch prediction score.

* * * * *